INVENTORS
Karl W. Hering
Robert F. Kane Jr.
ATTORNEYS

Oct. 21, 1958  K. W. HERING ET AL  2,857,568
VOLTAGE COMPARATOR
Filed July 22, 1953  4 Sheets-Sheet 2

INVENTORS
Karl W. Hering
Robert F. Kane Jr.
BY
Pennie Edmonds Morton, Barrows & Taylor
ATTORNEYS Oct. 21, 1958 K. W. HERING ET AL 2,857,568
VOLTAGE COMPARATOR
Filed July 22, 1953 4 Sheets-Sheet 3

INVENTORS
Karl W. Hering
Robert F. Kane Jr.
BY
Pennie, Edmonds, Morton, Barrows & Taylor
ATTORNEYS INVENTORS
Karl W. Hering
Robert F. Kane Jr.
BY
ATTORNEYS

United States Patent Office 2,857,568
Patented Oct. 21, 1958

2,857,568

VOLTAGE COMPARATOR

Karl W. Hering, Ridgefield, and Robert F. Kane, Jr., Norwalk, Conn., assignors to The Perkin-Elmer Corporation, Norwalk, Conn., a corporation of New York Application July 22, 1953, Serial No. 369,688

14 Claims. (Cl. 324—99)

This invention relates to a device for determining ratio and phase relationships of two voltages, and more particularly for the measurement of the ratios of the in-phase and quadrature components of a voltage derived from an A. C. source to the in-phase component of a larger voltage derived from the same source.

For example, for two signals in an electronic computer, these ratios are determined by using the source voltage as the phase reference. This reference is modified by attenuation and phase reversal, if necessary, to a voltage equal in magnitude but opposite in phase to the in-phase component of the larger of the two voltages being measured. The second voltage is then compared against this modified reference voltage, with its in-phase and quadrature components ratioed thereto.

A common source for the instrument and the signals under study is necessary to establish phase reference during measurement. Frequency and phase changes are zero and any amplitude changes affect both the numerator and the denominator of the ratio of the signal voltages in the same proportion. Hence, the true ratio is undisturbed by line changes.

The invention will be understood by reference to the following description considered in connection with the accompanying drawings in which.

Figure 1:
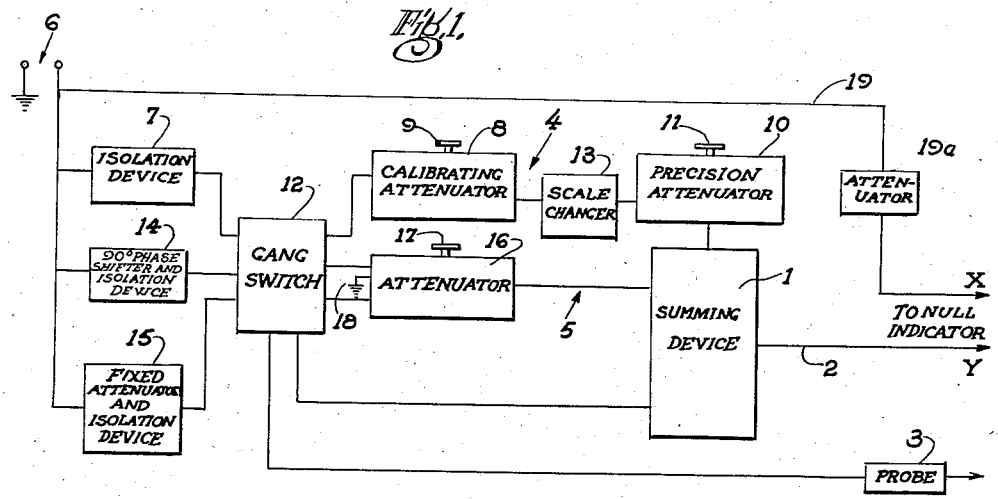
Figure 1 is a block diagram of a manually operable instrument in accordance with the invention.

Referring now to Figure 1, a summing device 1 has an output 2 leading to the input of a suitable null indicator and three inputs, one each from a test probe 3, in-phase channel 4 and quadrature channel 5. Channels 4 and 5 are connected in parallel to a source 6 having one side power grounded.

The null indicator is not shown, but any suitable voltage sensitive device, such as an oscilloscope, a servo system, or an amplifier-phone combination, may be used. An oscilloscope is adopted in the description which follows, with output 2 establishing the "Y" axis and the reference voltage the "X" axis.

In-phase channel 4 includes, in series, an isolation device 7 which provides an isolated ground system within the instrument and permits reversal of the phase of voltage 6, a calibrating attenuator 8 adjustable by dial 9, a precision attenuator 10 adjustable by dial 11, and means for reversing the phase, as by a gang switch 12 to be more fully described below. It may be desirable to include also a scale changer 13 for expanding the scale associated with dial 11.

Quadrature channel 5 comprises, in series, 90° phase shifter and isolation device 14 and fixed attenuator and isolation device 15, selectable through gang switch 12, and an attenuator 16 adjustable by dial 17, together with means for phase reversal as by the signal grounded center tap 18 of attenuator 16.

Gang switch 12 also interrupts the circuit from probe 3 to permit the probe to be disconnected and to ground the input to the summing impedance.

The instrument may be used for a rapid and very accurate determination of the ratios of the in-phase and quadrature components of a voltage derived from source 6 to the in-phase component of another voltage also derived from source 6, by employing source 6 as a reference voltage. To make these measurements, dial 11 of precision attenuator 10 is first adjusted to a convenient ratio denominator which may be its maximum setting of 100, for instance. With the signal ground system of the instrument tied in with the signal ground system of the unit to be tested and the source input through line 19 and attenuator 19a established as the "X" axis reference of the oscilloscope, test probe 3 is touched to the tap of the larger signal voltage, called $V_1$. Through gang switch 12, the signal $V_1$ is impressed upon the summing device 1 and the resultant signal is applied to the "Y" axis of the oscilloscope. Isolation device 7 isolates a voltage in channel 4 either in-phase or 180° out of phase with the source, depending upon the setting of gang switch 12, with the result that the in-phase component of $V_1$ (called $V_{p1}$) whether in-phase or 180° out of phase with the reference voltage may be nulled by turning dial 9 of calibrating attenuator 8 until the magnitude of the isolated voltage is matched to that of $V_{p1}$. In order to ascertain the exact null it may be desirable or necessary to eliminate the quadrature component (called $V_{q1}$) in summing device 1, and this may be accomplished by channel 5. There 90° phase shifter and isolation device 14 establishes an isolated voltage lagging the reference voltage by 90°, which, if $V_{q1}$ is leading 90°, may be matched to that of $V_{q1}$ by turning dial 17 of attenuator 16 until a null is obtained. In practice dials 9 and 17 may be adjusted simultaneously to null both components of $V_1$. Should $V_{q1}$ lag the reference voltage by 90°, then the phase of the isolated voltage in channel 5 will have to be shifted 180° so as to be reversed, as may be accomplished by positioning the grounded center tap 18 of attenuator 16, for purposes of nulling. At the null point there is effectively set into channel 4 an attenuation factor equal to the ratio of $V_{p1}$ to the reference voltage. The output of channel 4 is a voltage, called the "modified reference voltage," equal in magnitude to $V_{p1}$.

Now by touching probe 3 to the second signal $V_2$, and nulling its in-phase component $V_{p2}$, with dial 11 of precision attenuator 10 and nulling its quadrature component $V_{q2}$, with dial 17 as before, the reading on dial 11 indicates directly the ratio $V_{p2}/V_{p1}$, since dial 11 initially was at its maximum setting. By calibrating dial 11 from 0 to 100, a percentage reading may be had. It may be necessary to reverse the direction of the phase in channel 4, to obtain this second null, whereby the position of gang switch 12 indicates the phase of $V_{p2}$, i. e. 180° or 0°.

If quadrature ($V_{q2}$) is also nulled as was done with $V_{q1}$, the input to summing device 1 from channel 5 is a voltage of equal magnitude and opposite phase with respect to $V_{q2}$ (the position of dial 17 with respect to ground 18 is likewise indicative of the phase of $V_{q2}$). The ratio $V_{q2}/V_{p1}$ can then be measured by positioning gang switch 12 to disconnect the signal summing input from the probe and signal grounding it. In this position gang switch 12 also disconnects the 90° phase shifter and isolation device 14 from attenuator 16 and in its place connects fixed attenuator and isolation device 15 which furnishes to attenuator 16 a signal equal in amplitude to that of phase shifter 14 but in phase with the source 6. The attenuated in-phase output of channel 5 may therefore be nulled by appropriate adjustment of dial 11. The reading on dial 11 is then equivalent to the ratio $V_{q2}/V_{p1}$. The phase of the isolated voltage in channel 4 may be reversed with gang switch 12 if necessary to obtain a null, and similarly its position indicates the quadrant phase of $V_{q2}$.

Figure 5:
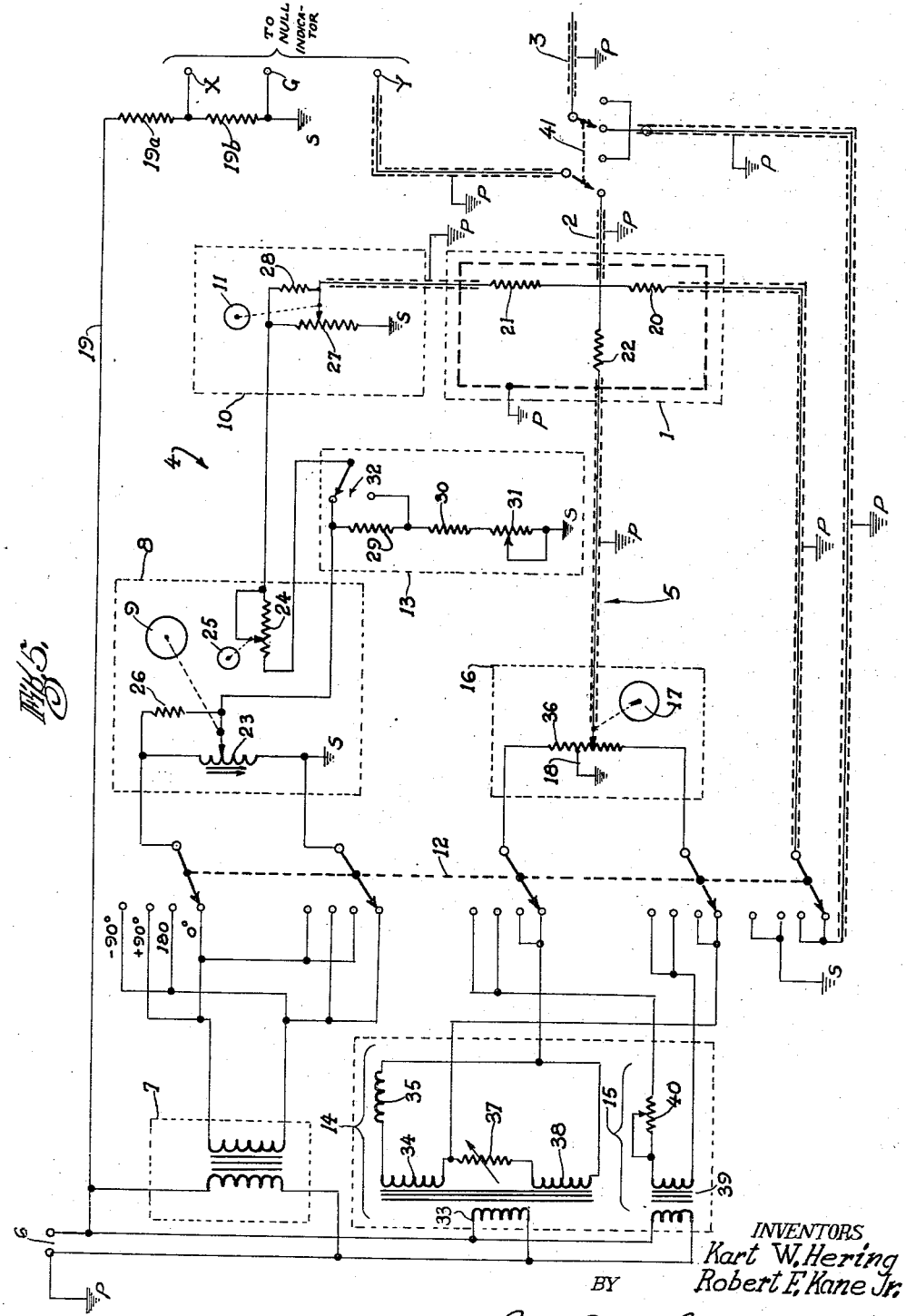
Figure 5 is a schematic circuit diagram of the instrument in Figure 1.

A circuit for accomplishing the foregoing measurements is shown in Figure 5. There the instrument is connected across terminals of the source 6 from which the two signals to be compared are also derived. This input also establishes through line 19 and attenuator 19a the "X" axis reference for the oscilloscope, with a resistor 19b and a tap G to signal ground. The "Y" terminal of the oscilloscope is connected directly to output 2 of summing device 1.

Summing device 1 receives input from test probe 3 through a resistor 20, from channel 4 through a resistor 21, and from channel 5 through a resistor 22. All input lines to the summing device, its output line, and the test probe lead are shielded, with shields power grounded. Channel 4 employs as an isolation device 7 a transformer suitably corrected for internal phase shifts, with its primary winding connected across the reference phase 6 and the secondary connected to a two-pole, four-position gang switch 12 for phase reversal. The switch output is impressed upon a calibrating attenuator 8 which, in this embodiment, is a two-step device having a variable inductance 23 signal grounded on one side and adjustable with dial 9 for coarse calibration, and a variable resistor 24 in series with inductance 23 and adjustable with a dial 25 to a finer calibration. A resistor 26 is shunted from the high side to the arm of inductance 23 for load correction. Lower pick-up is experienced by use of a variable auto-transformer instead of a rheostat for calibrating attenuator 8 because of the lower output impedance.

The output of calibrating attenuator 8 is connected to precision attenuator 10 which here is shown to be a variable resistor 27, suitably signal grounded and adjustable by dial 11. Here again, a resistor 28 is shunted across the ungrounded end to the wiper on resistor 27 for purposes of load correction. Scale changer 13 consists of resistors 29, 30, and 31 serially connected between the output of variable inductance 23 and signal ground. A switch 32 is disposed and arranged to selectively tap either the signal developed across all three resistances 29, 30, and 31 or only that portion of the signal which is developed across resistors 29, 30 and 31 are such that adjustable resistance 31 may be preset to precisely calibrate for a desired ratio, such as 10 to 1, and scale changer 13 thus permits a scale associated with dial 11 of precision attenuator 10 to be expanded in a predetermined ratio, such as 10 to 1.

In channel 5, 90° phase shifter and isolation device 14 includes a transformer with a primary 33 across the source 6 of voltage and a secondary 34, and a lag circuit comprising inductor 35 and variable resistor 36 having a center tap 18 signal grounded for phase reversal. This circuit provides a voltage across resistor 36 shifted out of phase with reference to the source by an angle approaching 90°. In order to provide exactly 90° phase shift, a correction is added by use of a parallel circuit across resistor 36, comprising variable resistor 37 and another secondary winding 38. The phasing between secondaries 34 and 38 and the value of resistor 37 are selected to give a voltage across resistor 36 which is 90° removed from the reference voltage, while the network also isolates this component from power ground. Resistor 36 may be selectively tapped by positioning dial 17 and functions as attenuator 16.

Though other circuits may be chosen for these phase shift and isolation features, the one described is desirable because of its characteristic of maintaining 90° phase shift over relatively wide frequency ranges, and its ease of adjustment. It is insensitive because the ratio of the product of angular frequency and inductance divided by the resistance is maintained large for the frequency range over which the instrument is designed to be operated.

Another position associated with gang switch 12 permits the alternate selection in channel 5 of fixed attenuator and isolation device 15, consisting of transformer 39 and associated pre-set dropping resistor 40, instead of 90° phase shifter and isolation device 14. When so connected, the network 15 impresses upon resistor 36 a signal equal in magnitude to that developed by network 14 but in phase with respect to the reference voltage at source 6. Dial 17 associated with resistor 36 functions as previously described to permit adjustment of the voltage output of channel 5, which is introduced as the input to resistor 22 of summing device 1.

The line between test probe 3 and resistor 20 of summing device 1 is interrupted by another blade of gang switch 12. In the first or lower position of gang switch 12, as shown in Figure 5, the summing device receives the probe input. The same relative position across channel 4 is labeled "0°" phase to indicate that the component of the signal from the probe which is nulled under these operative conditions is in phase with the reference voltage, while in channel 5 network 14 is placed in the circuit. The second switch position, noted at "180°" in channel 4, has no effect on the probe input and channel 5 circuits, but displaces the phase 180° in channel 4 by reversing the connections to the secondary winding of isolation device 7. Thus, a null obtained with switch 12 in this position indicates that a component of the probe signal is of opposite phase to the reference signal. Each of the third and fourth positions of gang switch 12 disconnects probe 3 and signal grounds resistor 20, while in channel 5 network 15 is switched in. In channel 4 the functions of the first two positions are repeated but are labeled "+90°" and "−90°," respectively, for purposes which are described below. Another switch 41 may be interposed in the input line of test probe 3 to transfer the signal directly to the oscilloscope to observe its nature if desired.

In operating the instrument, the reference signal in the form of source 6 is connected to the input terminals of the instrument and "X" and "Y" inputs to the null indicator are connected as has been described hereinbefore. The dial 11 of precision attenuator 10 is first turned to its extreme or 100% position, gang switch 12 is placed in the lower position shown, and the terminal G of the signal ground system is tied into the signal ground system of the unit under test. The signal ground system of course must eventually return to power ground. Then probe 3 is touched to the source of the larger signal voltage $V_1$, to introduce that voltage through resistor 20 of summing device 1. The in-phase component $V_{p1}$ may be nulled against the isolated voltage in channel 4 with calibrating attenuator 8 by adjusting with coarse and fine dials 9 and 25 as necessary. The null point may readily be observed on the oscilloscope screen by the disposition of a Lissajous type visual pattern, but if the in-phase component is 180° out of phase with respect to the reference voltage, nulling cannot take place until the isolated voltage in channel 4 is reversed 180° by switch 12 shifting to the pair of taps in the circuit identified "180°." Simultaneously with the nulling of the in-phase component, the quadrature phase may be nulled with attenuator 16 against the isolated voltage in channel 5 that has been caused to lag 90° by network 14. Nulling of the quadrature component will be indicated on the oscilloscope screen by the merging of the Lissajous pattern into a single straight line. Since attenuator 16 includes a resistor 36 with a grounded center tap 18, phase reversal of the voltage across resistor 36 is accomplished merely by moving the variable contact from one side of the center tap to the other. In this way, by a simple and rapid trial and error method, quadrature interference of either quadrant or phase sense may be eliminated to permit precise attenuation of the reference voltage in channel 4 with fine adjustment dial 25. At the null point the voltage appearing across attenuator 8 is now established as the modified reference voltage, which is equal in magnitude and opposite in phase to the in-phase component of $V_1$, $V_{p1}$, while the output voltage of channel 5 is equal in magnitude to $V_{q1}$ but is opposite in phase.

Probe 3 is next removed from the $V_1$ tap and is placed on the $V_2$ signal to introduce the second signal to summing device 1. It will be recalled that precision attenuator 10 was first adjusted to its maximum or 100% position by dial 11. The in-phase component $V_{p2}$ may now be nulled with dial 11, and through a scale associated therewith, a direct reading in percent of the ratio $V_{p2}/V_{p1}$ may be had, the accuracy of which depends upon the calibrated accuracy of attenuator 10 and stability of other components. If the phase is opposite to the reference, then switch 12 may be shifted to the "180°" position to permit nulling, this shift indicating phase sense of $V_{p2}$. The quadrature component $V_{q2}$ may be nulled with dial 17, as before, though the circuit shown also allows the ratio $V_{q2}/V_{p1}$ to be measured by shifting gang switch 12 to its third position to disconnect the probe, signal ground resistor 20, and connect alternate network 15 in channel 5. At this setting the only inputs to summing device 1 are the voltages from channels 4 and 5. A voltage equal in magnitude to $V_{q2}$ but in phase with the reference source 6, is produced by network 15 and alternator 16 and developed across resistor 22. Accordingly, it is possible to obtain a balance or null by attenuating the modified reference voltage with dial 11. If $V_{q2}$ is leading the reference voltage by 90°, this condition is indicated by the "+90°" switch position. If $V_{q2}$ lags by 90°, the "—90°" switch position is used to reverse the voltage in channel 4 before nulling. The switch position again indicates the relative phase sense of $V_{q2}$, and setting of dial 11 furnishes directly the percentage ratio $V_{q2}/V_{p1}$. Obviously, the ratio $V_{q1}/V_{p1}$ could have been determined in a similar manner.

Figure 6:
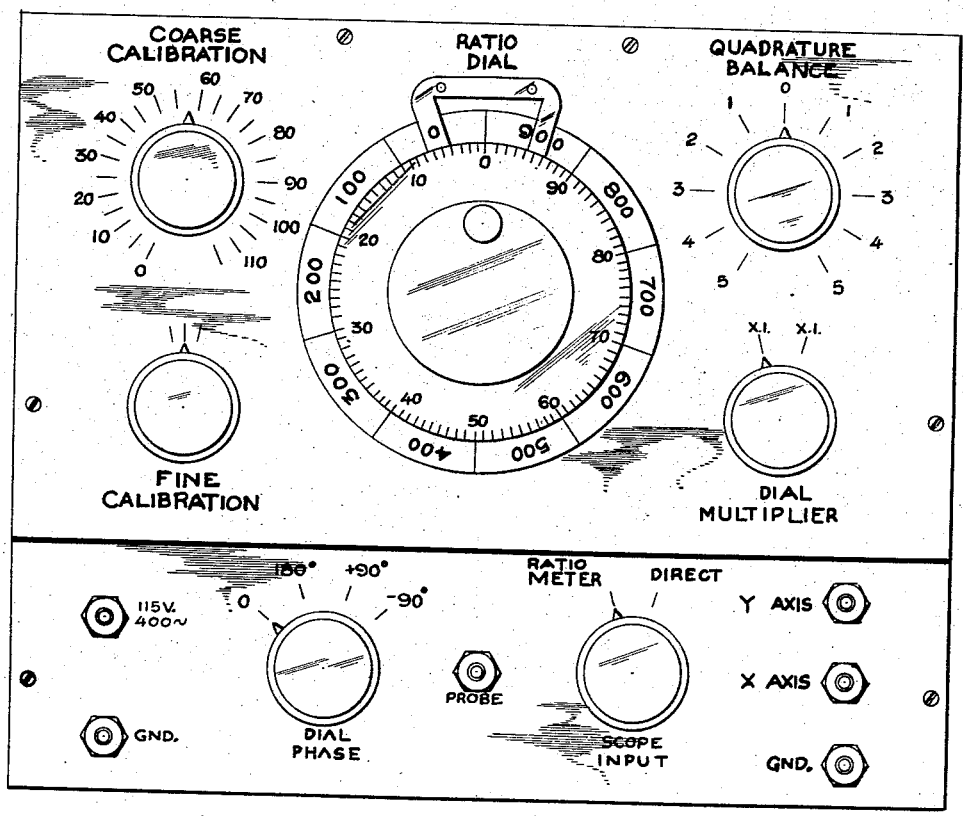
Figure 6 is a front view of a panel layout for the instrument in Figures 1 and 5.

A panel board for the instrument described above is shown in Figure 6. The oscilloscope is connected across the two taps in the lower right hand corner designated "Y axis" and "X axis." The signal ground system of the unit to be tested is plugged into the signal ground system of the present instrument through the "GND" tap at the lower right hand corner. The test probe plugs into the center "Probe" tap. Power input is through the two taps in the lower left hand corner marked "115 v. 400~" and "GND," this instrument having been designed for 115 volts and a frequency of 400 cycles.

The upper left dial marked "Coarse Calibration" corresponds to dial 9, Figures 1 and 5, while the dial below that labeled "Fine Calibration" is dial 25. Each has appropriate scale markings. Precision attenuator 10 is adjusted with the large center dial labeled "Ratio Dial," having an outer scale with readings from 0 to 1000 units by hundreds and a concentric inner dial scaled with readings from 0 to 100 units, the two dials being geared 10 to 1. Scale expansion is accomplished with the knob labeled "Dial Multiplier," with positions for full scale and one-tenth scale marked "X1." and "X.1," respectively. This corresponds to switch 32 in Figure 5. Dial 17 for attenuating either the quadrature voltage developed by 90° phase shifter and isolation device 14, or the in-phase voltage developed by isolation device 15 is in the upper right hand corner marked "Quadrature Balance" with a scale on either side of a zero center point to indicate roughly the magnitude. Gang switch 12 is operated with the lower left dial called "Dial Phase" with its four positions noted as "0," "180°", "+90" and "—90," these corresponding to those shown in Figure 5. Switch 41 is the "Scope Input" knob in Figure 6, with one setting marked "Ratiometer" where the circuit from the probe is through the summing network, and the other setting marked "Direct" when the input is to oscilloscope.

This completes an instrument with manual control for comparing two voltages in a rapid and accurate manner.

Figure 2:
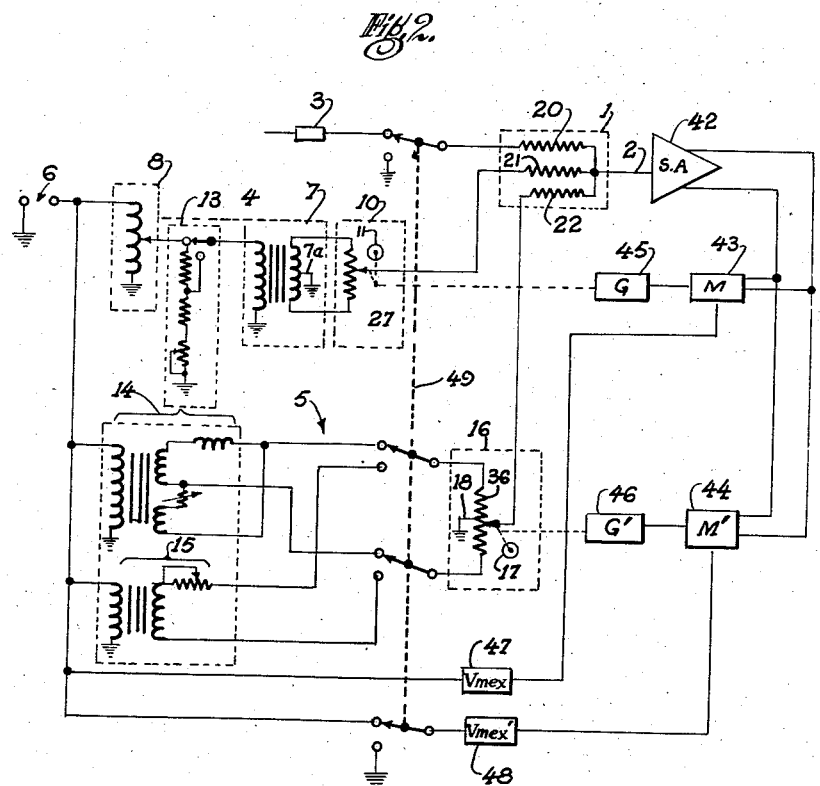
Figure 2 is a circuit diagram, partly schematic and partly in block form, of a second embodiment of the invention.

The device may also be designed for automatic operation by replacing the oscilloscope with a servomechanism coupled to the attenuators in channels 4 and 5 and responsive to the output of the summing device. Such a scheme is illustrated in Figure 2 where circuit elements represented in Figure 5 are similarly numbered. It may be noted in this connection that isolation transformer 7 is interposed between precision attenuator 10 and calibrating attenuator 8 and that the fine adjustment on calibrating attenuator 8 is eliminated. These differences over the arrangement in Figure 5 are questions of convenience of design. Another difference is that the system of Figure 2 employs a transformer having a grounded center tap 7a on the secondary winding for phase reversal in channel 4.

The servomechanism includes a servoamplifier 42, the input to which is output 2 of summing device 1, and a pair of two phase induction type servomotors 43 and 44 for channels 4 and 5, respectively. The servomotors are connected in parallel to receive the output of servoamplifier 42 and are coupled respectively to gear reduction units 45 and 46 leading to the adjustable elements of attenuators 10 and 16 respectively. The second winding of servomotor 43 receives its excitation from a motor reference source 47 connected to the source 6 of reference voltage. Motor reference source 47 shifts the phase of the reference voltage 90° while servoamplifier 42 may be designed for either no phase shift or complete reversal, so that servomotor 43 operates only when the input from servoamplifier 42 includes an in-phase component or one shifted 180° thereto.

The excitation of servomotor 44 is from motor reference source 48 that likewise connects the source 6 of reference voltage; however, motor reference source 48 is essentially a transformer and does not shift the reference phase; hence, if the input to servomotor 44 from servoamplifier 42 contains quadrature, servomotor 44 will operate.

The motor reference sources may include inductance, resistance or capacitance and a vacuum tube amplifier, if high impedance is required. A more complete description of servomotor systems including the usual stabilizers and their operation appears in copending application for United States Letters Patent Serial Number 226,861, filed May 17, 1951, by John G. Urbanik.

A gang switch 49 has two selectable positions to connect in channel 5 either 90° phase shifter and isolation device 14 or fixed attenuator and isolation device 15. At the same time, gang switch 49, when in the position illustrated, connects probe 3 to resistor 20 and connects motor reference source 48 to the line, but in the alternate position it signal grounds both resistor 20 and motor reference source 48.

To use the instrument just described, test probe 3 is touched to the tap of the first signal voltage $V_1$ at which time the servomechanism automatically nulls both channels 4 and 5 through servomotors 43 and 44, respectively. For direct ratio reading, calibrating attenuator 8 is then adjusted manually until dial 11 of precision attenuator 10 reaches its maximum or 100% setting. At the null point, the modified reference voltage in effect is stored in channel 4 and, if the ratio $V_{q1}/V_{p1}$ is desired, switch 49 is changed to its alternate position so that the only inputs to summing device 1 are from channels 4 and 5, since resistor 20 is signal grounded. At the same position, the excitation on the second winding of servomotor 44 is signal grounded to prevent possible movement of its rotor which would alter the null setting of attenuator 16 and fixed attenuator and isolation device 15 is in the circuit. A null effected with servomotor 43 then provides a direct reading on dial 11 of the ratio $V_{q1}/V_{p1}$.

To measure the relations of the second signal voltage $V_2$, switch 49 is returned to its first position and probe 3 is touched to the $V_2$ tap. The new input through summing device 1 will cause the servomechanism to adjust attenuators 10 and 16 as necessary to reach another null. At this time, dial 11 will indicate directly the ratio $V_{p2}/V_{p1}$. If switch 49 is now changed to its lower position, another null is obtained similarly and the reading on dial 11 will be equal to the ratio $V_{q2}/V_{p1}$.

Figure 3:
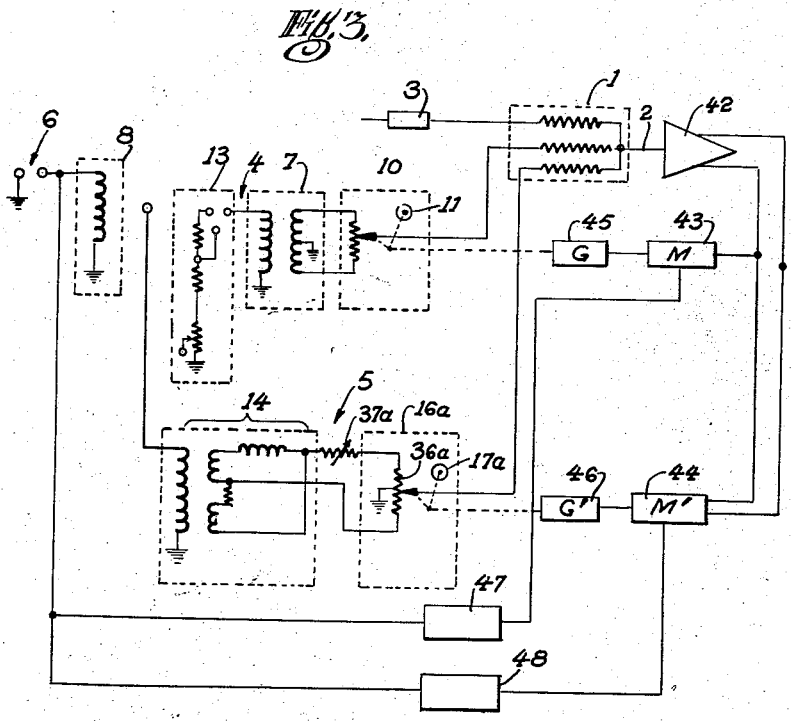
Figure 3 is a circuit diagram, partly schematic and partly in block form, of a third embodiment of the invention.

For some applications, it may be desirable to have direct and simultaneous readings of the ratios $V_{p2}/V_{p1}$ and $V_{q2}/V_{p1}$. Apparatus for accomplishing this is illustrated by Figure 3, which is a modification of the instrument in Figure 2 in the following respects. Channel 5 is in parallel with the output of calibrating attenuator 8 in channel 4. Fixed attenuator and isolation device 15 is eliminated as is gang switch 49. The same type of servomechanism loops may be used in the embodiments of Figures 1 and 5. In addition attenuator 16a is a precision type like attenuator 10 and has a dial 17a for direct ratio reading.

In using this instrument, probe 3 is touched to the tap of the first signal voltage at which condition the servomechanism nulls each $V_1$ component as before. Calibrating attenuator 8 is then adjusted manually until dial 11 is at its 100% position. The output of calibrating attenuator 8 is the input to each of channels 4 and 5. The transfer ratios of channels 4 and 5 are established as identical by use of trim resistor 37a. With the zero reading of dial 17a representing no voltage output from impedance 36a, dial 17a will here furnish directly the ratio $V_{q1}/V_{p1}$. 90° phase shifter and isolation device 14 produces a constant attenuation with the result that voltage changes in channel 5 do not alter the presentation of percentage reading on dial 17a.

Now when probe 3 is connected to $V_2$, the servomechanism, through servomotors 43 and 44, nulls the two components, and dials 11 and 17a provide directly the ratios $V_{p2}/V_{p1}$ and $V_{q2}/V_{p1}$, respectively.

Figure 4:
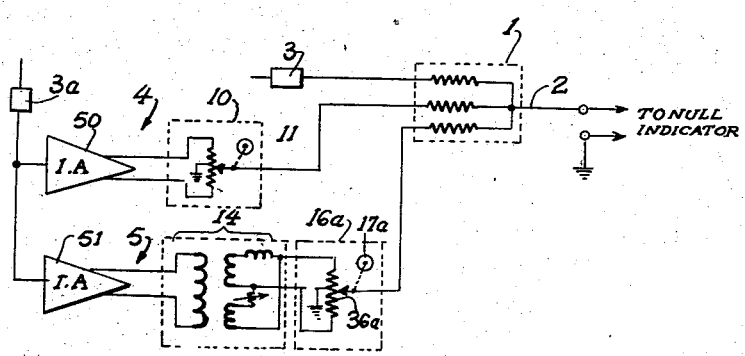
Figure 4 is a circuit diagram, partly schematic and partly in block form, of a fourth embodiment of the invention.

A fourth instrument is shown in Figure 4 for using the first signal voltage as a reference and measuring the ratios $V_{p2}/V_1$ and $V_{q2}/V_1$. The reference voltage input is through a second test probe 3a. In-phase channel 4 comprises an isolation amplifier 50 and precision attenuator 10, while quadrature channel 5 includes a similar isolation amplifier 51, 90° phase shifter and isolation device 14 and precision attenuator 16a. These two channels furnish inputs to summing device 1 as does a test circuit through probe 3. The isolation amplifiers are feedback amplifiers which provide output voltages the same in magnitude and phase as input voltages, and are characterized by very high input impedance and low output impedance. The circuit shown in Figure 4 is for manual operation, as in Figure 5, but it could be modified for servo operation.

In using this device, probe 3a is connected to $V_1$ and probe 3 to $V_2$. Dials 11 and 17a may then be adjusted manually to null out both the in-phase and quadrature components of $V_2$ with respect to $V_1$. With dials 11 and 17a calibrated with their zero points at no output of impedances 27 and 36a, respectively, readings at the null point furnish the ratios $V_{p2}/V_1$ and $V_{q2}/V_1$. The characteristics of $V_1$ with respect to the common reference source may be determined in similar manner by touching probe 3 to $V_1$ and connecting probe 3a to the source.

We claim:
1. Electrical measuring apparatus comprising a summing device, an in-phase channel adapted to impress a reference voltage on said summing device, said in-phase channel including a calibrating attenuator and a second attenuator having indicating means associated therewith, a quadrature channel including a voltage attenuating means and adapted to shift by 90° the phase of the reference voltage and to impress the phase shifted voltage on the summing device, means for impressing on said summing device a voltage externally derived from the reference voltage, and a servo system including a servoamplifier having an input connected to the output of the summing device, first and second servomotors connected to the output of said servoamplifier, said servomotors having rotors, first gear means coupling the rotor of a first of said motors to the indicating means associated with the second in-phase attenuator, second gear means coupling the rotor of the second of said motors to the indicating means of said quadrature attenuator, first phase-shift means coupling said second voltage to said first servomotor and second phase-shift means coupling said second voltage to said second servomotor, said first phase-shift means being adapted to furnish an output voltage 90° displaced with respect to the in-phase component of said first voltage at the output of said servoamplifier, and said second phase-shift means being adapted to furnish an output voltage 90° displaced with respect to the quadrature component of said first voltage at the output of said servoamplifier.

2. An instrument for measuring the in-phase and quadrature components of a signal relative to a synchronous source comprising means for developing a first signal in phase therewith, first adjustable attenuation means and a calibrated attenuation means serially connected to receive said first in-phase signal, means coupled to said source for developing a signal in quadrature therewith, means coupled to said source for developing a second signal in phase therewith and having an amplitude equal to said quadrature signal, second adjustable attenuation means connectibly disposed to receive either of said two last-named signals, summing means connected to receive the signal to be measured and the output signals of said first and second adjustable attenuation means, means for selectively switching the input of said second attenuation means from said quadrature signal to said second in-phase signal, said last-mentioned means being adapted to simultaneously disconnect said signal to be measured from said summing means, and a phase-sensitive means connected to indicate the difference between the output of said summing means and said source.

3. An instrument for measuring the in-phase and quadrature components of a signal relative to a synchronous source comprising means for developing a first signal in phase therewith, first adjustable attenuation means and a calibrated attenuation means serially connected to receive said first in-phase signal, means coupled to said source for developing a signal in quadrature therewith, means coupled to said source for developing a second signal in phase therewith and having an amplitude equal to said quadrature signal, second adjustable attenuation means connectibly disposed to receive either of said two last-named signals, summing means connected to receive the signal to be measured and the output signals of said first and second attenuation means, means for selectively switching the input of said second attenuation means from said quadrature signal to said second in-phase signal, said last-mentioned means being adapted to simultaneously disconnect said signal to be measured from said summing means, and null indicator means connected to indicate the difference between the output of said summing means and said source.

4. An instrument for measuring the in-phase and quadrature components of a signal relative to a synchronous source comprising means for developing a first signal in phase therewith, said means including selective phase-reversal means, first adjustable attenuation means and calibrated attenuation means serially connected to receive said first in-phase signal, means coupled to said source for developing a signal in quadrature therewith, means coupled to said source for developing a second signal in phase therewith and having an amplitude equal to said quadrature signal, second adjustable attenuation means connectibly disposed to receive either of said two last-named signals, summing means connected to receive the signal to be measured and the output signals of said first and second attenuation means, means for selectively switching the input of said second attenuation means from said quadrature signal to said second in-phase signal, said last-mentioned means being adapted to simultaneously disconnect said signal to be measured from said summing means and null indicator means connected to indicate the difference between the output of said summing means and said source.

5. An instrument for measuring the in-phase and quadrature components of a signal relative to a synchronous source comprising means coupled to said source for developing a first signal in phase therewith, a first adjustable attenuation means and a calibrated means serially connected to receive said in-phase signal, means coupled to said source for developing a signal in quadrature therewith, means coupled to said source for developing a second signal in phase therewith and having an amplitude equal to said quadrature signal, second adjustable attenuation means connected to receive said two last-named signals, summing means connected to receive the signal to be measured and the output signals, adjustable attenuation means, multiple position switch means disposed and adapted for selectively reversing the connection of the second in-phase signal to said first adjustable attenuation means at one of its positions and for selectively switching the input of said second attenuation means from said quadrature signal to said second in-phase signal at another of its positions, said last-mentioned means being operative upon switching to said latter position to simultaneously disconnect said signal to be measured by said summing means, and a null indicator means connected to indicate the difference of the output of said summing means and said source.

6. An electrical measuring instrument in accordance with claim 5 in which the means developing the quadrature signal includes selective phase-reversing means.

7. An electrical measuring instrument in accordance with claim 5 in which the means coupled to said source are electrically isolated therefrom.

8. Electrical measuring apparatus comprising a summing device, means for connecting a null indicator to said summing device, means for impressing on said summing device a voltage externally derived from a reference voltage, an in-phase channel adapted to impress the reference voltage on said summing device, said in-phase channel including a calibrating attenuator and a second attenuator having indicating means associated therewith, and a quadrature channel adapted to shift the phase of the reference voltage and to impress the phase shifted voltage on the summing device, said quadrature channel including a voltage attenuating means, means shifting the phase of the reference voltage by 90°, means for selectively impressing on the quadrature channel attenuating means either the output of the phase shifting means or a voltage having the same magnitude as and 180° out of phase with the reference voltage, and a servo system including a servoamplifier having an input connected to the output of said summing device, first and second servomotors connected to the output of said servoamplifier, said servomotors having rotors, first gear means coupling the rotor of the first of said motors to the indicating means associated with the second in-phase attenuator, second gear means coupling the rotor of the second of said motors to the adjustable member of said quadrature attenuator, first phase-shift means coupling said second voltage to said first servomotor and second phase-shift means coupling with second voltage to said second servomotor, said first phase-shift means being adapted to furnish an output voltage 90° displaced with respect to the in-phase component of said first voltage at the output of said servoamplifier, said second phase-shift means being adapted to furnish an output voltage 90° displaced with respect to the quadrature component of said first voltage at the output of said servoamplifier, and means for disconnecting the second phase-shift means when the externally derived voltage is disconnected.

9. An instrument for measuring the in-phase and quadrature components of a signal relative to a synchronous source comprising means coupled to said source for developing a first signal in-phase therewith, said means including an isolation amplifier having a high input impedance, first adjustable attenuation means and a calibrated attenuation means serially connected to receive said first in-phase signal, means coupled to said source for developing a signal in quadrature therewith, said means including an isolation amplifier having a high input impedance means coupled to said source for developing the second signal in-phase therewith and having an amplitude equal to said quadrature signal, second adjustable attenuation means connectibly disposed to receive either of said two last-named signals, summing means connected to receive the signal to be measured and the output signals of said first and second attenuation means, means for selectively switching the input of said second attenuation means from said quadrature signal to said second in-phase signal, said last-mentioned means being adapted to simultaneously disconnect said signal to be measured from said summing means and null indicator means connected to indicate the difference between the output of said summing means and said source.

10. An instrument for measuring the in-phase and quadrature components of a signal relative to a synchronous source, means comprising said source for developing a first signal in phase therewith, first adjustable attenuation means and calibrated attenuation means serially connected to receive said first in-phase signal, means coupled to said source for developing a signal in quadrature therewith, said means including a phase-shift lag network, means coupled to said source for developing a second signal in phase therewith and having an amplitude equal to said quadrature signal, second adjustable attenuation means connectibly disposed to receive either of said two last-named signals, summing means connected to receive the signal to be measured and the output signals of said first and second attenuation means from said quadrature signal to said second in-phase signal, said means being adapted to simultaneously disconnect said signal to be measured from said summing means and null indicator means connected to indicate the difference between the output of said summing means and said source.

11. An electrical measuring instrument in accordance with claim 10 in which said lag network consists of inductance and resistance elements serially connected.

12. An electrical measuring instrument in accordance with claim 11 in which the parameters of the inductance and resistance elements of the lag network minimize phase-shift variations with changes in frequency of the source signal.

13. An electrical measuring instrument in accordance with claim 3 including means for developing a signal 180° out of phase with said source which comprises a transformer coupled to said source and serially connected with a resistor.

14. An instrument for measuring the in-phase and quadrature components of a signal relative to a synchronous source comprising means for developing a first signal in phase therewith, said means including selective phase-reversal means, first adjustable attenuation means and calibrated attenuation means serially connected to receive said in-phase signal, means coupled to said source for developing a signal in quadrature therewith, said means including selective phase-reversal means, means coupled to said source for developing a second signal in phase therewith and having an amplitude equal to said quadrature signal, second adjustable attenuation means connectibly disposed to receive either of said two last-named signals, summing means connected to receive the signal to be measured and the output signals of said first and second attenuation means, means for selectively switching the input of said second attenuation means from said quadrature signal to said second in-phase signal, said last-mentioned means being adapted to simultaneously disconnect said signal to be measured from said summing means and a phase-sensitive means connected to indicate the difference between the output of said summing means and said source.

References Cited in the file of this patent

UNITED STATES PATENTS

| | | |
|---|---|---|
| 2,440,200 | Jofeh | Apr. 20, 1948 |
| 2,595,675 | Jaynes | May 6, 1952 |
| 2,618,686 | Lange | Nov. 18, 1952 |
| 2,622,127 | Alsberg | Dec. 16, 1952 |
| 2,639,411 | Schafer | May 19, 1953 |
| 2,657,348 | Jarvis | Oct. 27, 1953 |

OTHER REFERENCES

Electronic Instruments, Greenwood, Holdam, MacRae, McGraw-Hill Book Co., 1948, page 33. (Copy in Div. 26.)